Sept. 19, 1961 M. B. GLASER ET AL 3,000,992
STORAGE OF ALUMINUM BROMIDE
Filed July 2, 1959
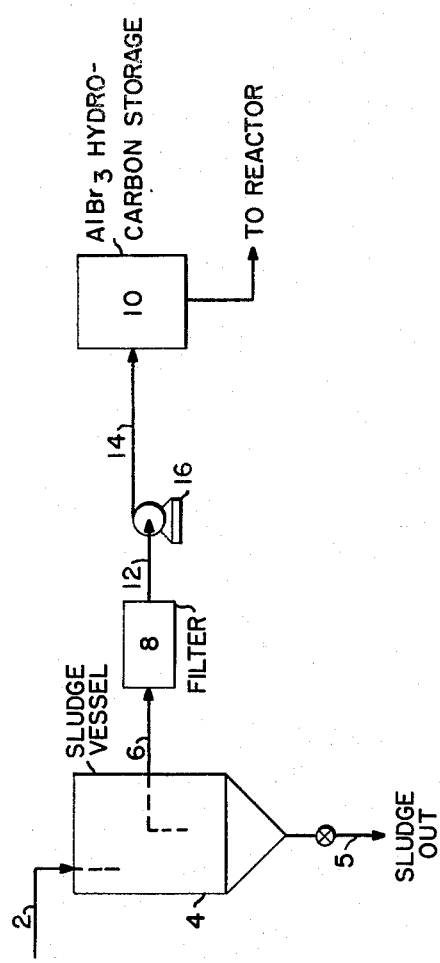
Marvin B. Glaser
Charles W. Tyson, Jr.   Inventors
By *Richard W. Nagel*   Patent Attorney

United States Patent Office 3,000,992
Patented Sept. 19, 1961

3,000,992
STORAGE OF ALUMINUM BROMIDE
Marvin B. Glaser and Charles W. Tyson, Jr., Plainfield, N.J., assignors to Esso Research and Engineering Company, a corporation of Delaware
Filed July 2, 1959, Ser. No. 824,558
6 Claims. (Cl. 260—683.53)

The present invention concerns improvements in the catalytic treatment of paraffin hydrocarbons with Friedel-Crafts reagents. More particularly, the present invention relates to improvements in the conversion of hydrocarbons employing aluminum bromide as the catalyst. Still more particularly, the present invention relates to improvements in storing and handling this extremely active catalyst.

Aluminum bromide in hydrocarbon solutions, such as used to catalyze hydrocarbon isomerization, polymerization, alkylation and kindred reactions, is extremely difficult to store for even relatively short periods of time. This is due to the fact that minute traces of impurities, particularly oxygenated or unsaturated compounds of any kind, cause sludge to form. Extremely minute traces of oxygen, of the order of 0.0001 mol percent, or water as low as 0.001 mol percent, and similar chain initiators catalyze this sludge formation. Though initially only a correspondingly small amount of sludge is formed, its presence further perpetuates the sludge reaction, thus leading to a continuous loss of aluminum bromide in sludge. Thus, it has been experimentally found that a light $C_5/C_8$ naphtha hydrocarbon containing 99+% anhydrous aluminum bromide upon storage at 80° F. in a closed container under dry nitrogen still results in continuous aluminum bromide loss to sludge. The solution half life was approximately 11 days.

It would be highly desirable to provide a means of storing aluminum bromide in non-reacting solvent so that a plant operating with this catalyst system may have a high degree of flexibility, and it is the principal object of the present invention to set forth such a process. By the process of the present invention, aluminum bromide-containing sludge resulting from reaction of $AlBr_3$ with contaminants in the solvent, such as air, moisture, olefins, oxygenated compounds and the like, is separated shortly after formation from the unreacted solution, and the aluminum bromide in solution may then be stored for substantial periods of time without further sludging and is thus available for further use in hydrocarbon conversion reactions.

The solution of aluminum bromide may initially be prepared by dissolving the solid, preferably in a purified form, in a paraffinic hydrocarbon solvent. This solvent may be the hydrocarbon which is later to be catalytically converted. Another method is to synthesize the aluminum bromide in situ by passing HBr or $Br_2$ through the solvent in the presence of aluminum turnings or other form of the metal. A suitable solvent, for instance, is a saturated naphtha having from 4 to 8 carbon atoms in the molecule. Naphthenic hydrocarbons may also be present.

In one specific embodiment of the present invention, an aluminum bromide hydrocarbon solution is stored for a short period of time, in the range of 2 to 5 hours, in vessel 4. Preferably, the solution is blanketed with inert gas, such as $N_2$, methane, and the like. The aluminum bromide may have been prepared in situ as described and passed into vessel 4 through line 2. The concentration of $AlBr_3$ in the hydrocarbon solution may be about 0.5 to 20 wt. percent. In vessel 4, which may be maintained at a temperature of from about 40° to 110° F., sludge is formed, even though initially the solution may be perfectly clear. The sludge that forms slowly flows to the bottom of the vessel, and may be drained out through line 5.

It is important not to allow the temperature to rise too high. Above 110° F., the rate of sludging increases quite rapidly, resulting in loss of a prohibitively large amount of $AlBr_3$.

At the end of about 2 to 5 hours, the solution of aluminum bromide in hydrocarbon, from which the bulk of sludge has been removed, is withdrawn through line 6, passed through filter 8 for removal of any entrained material, and then passed to storage vessel 10 for storage until needed. Preferably, an inert gas, such as nitrogen may be present. As a result of the initial treatment and sludge removal, no further sludging occurs.

Under certain circumstances, it is highly desirable to maintain in the solution of $AlBr_3$ in the hydrocarbon, from 0.5 to 10% by weight of HBr. The latter is a potent activator for such reactions as isomerization and alkylation. The gas is present in the solution, for instance, when $AlBr_3$ is synthesized by passage of HBr over aluminum metal in the presence of the organic solvent.

The present invention will be further illustrated by the following specific examples:

EXAMPLE 1

35 grams of aluminum bromide (98+% purity) were dissolved in 1000 cc. of a $C_5/C_8$ naphtha having a specific gravity of 0.7 and consisting of 25 volume percent pentanes, 25% hexanes, 30% heptanes and 20% octanes. The solution was stored in a dry box under nitrogen pressure at 75° to 85° F. Initially, complete solution took place. Within 10 to 15 minutes after solution, a red-brown sludge started to form.

The aluminum bromide content of the solution was determined with time and the decrease in aluminum bromide content is shown in the table below:

Table I
STORAGE OF $AlBr_3$-NAPHTHA SOLUTION WITHOUT DECANTATION

| Time (Hours): | Solution concentration Wt. percent $AlBr_3$ |
| --- | --- |
| 0 | 4.8 (Original Solution). |
| 1 | 4.4 (By Analysis). |
| 2 | 4.2 (By Analysis). |
| 10 | 3.0 (By Analysis). |
| 24 | 2.5 (By Analysis). |

The decrease is due to the loss of aluminum bromide to sludge.

In a second set of experiments the aluminum bromide solution prepared as described above was decanted after 1, 2, and 5 hours respectively and thereafter stored.

Table II
STORAGE OF DECANTED $AlBr_3$-NAPHTHA SOLUTIONS

| Decantation Time (Hours After Initial Mixing) | Storage Time (Days) | $AlBr_3$ Conc. (Wt. percent) |
| --- | --- | --- |
| 1 | 0 | 4.3 |
|   | 1 | 4.3 |
|   | 2 | 3.9 |
|   | 3 | 3.8 |
| 2 | 0 | 4.2 |
|   | 1 | 4.2 |
|   | 2 | 4.2 |
|   | 3 | 4.2 |
| 5 | 0 | 3.8 |
|   | 1 | 3.8 |
|   | 2 | 3.8 |
|   | 3 | 3.8 |

These data show that a 2-hour initial sludge formation period is sufficient prior to decantation. The resulting solution may then be stored for at least 3 days with substantially no sludge formation. Approximately 10 to 20% of the aluminum bromide precipitated out during the initial sludge formation period. Comparable experiments have been carried out with solutions varying from 0.5 to 20 wt. percent aluminum bromide in hydrocarbons and substantially the same results have been obtained.

EXAMPLE 2

The following example illustrates the results obtainable by the use of the present process, wherein an aluminum bromide solution in n-hexane is saturated with HBr at room temperature, sludge allowed to form, and supernatant liquid decanted. It is to be noted that the reagents employed were of a high grade of purity.

*Table III*

EFFECT OF HBr ON STORAGE OF AlBr₃-HYDROCARBON SOLUTIONS AlBr₃ SOLUTIONS SATURATED WITH HBr AT ROOM TEMPERATURE

| Test No. | A | B |
|---|---|---|
| Solvent | Pure n-Hexane | |
| AlBr₃ | Pure Grade | |
| | 1.6% AlBr₃, 2.7% HBr | |
| Solution | Original | Decanted |
| Observations: | | |
| At Start | Very Slight Residue | Very Clear. |
| 2 Days | No Change | |
| 3 Days | Dark Oil Sludge Developing | No Change. |
| 8 Days | Large Amount of Sludge | Do. |
| 10 Days | Increased Amount of Sludge | Do. |
| 14 Days | 100% of AlBr₃ to Sludge | Do. |
| | Analysis of Hexane Phase: Al=0.0% Br=1.9% | |

What is claimed is:

1. A process for stabilizing a solution of aluminum bromide in light saturated naphtha which comprises maintaining said solution at a temperature of from about 40° to about 110° F. for a period of from about two to about five hours in a sludge precipitation zone, precipitating a sludge, withdrawing said sludge from said zone, withdrawing from said zone said naptha containing a major portion of the AlBr₃ originally dissolved therein, passing said withdrawn and now stabilized naptha and AlBr₃ to a storage zone, and thereafter passing said naphtha containing AlBr₃ to Friedel-Crafts reaction zone.

2. The process of claim 1 wherein said AlBr₃ and naphtha are maintained in said sludge precipitation zone for about two to three hours.

3. The process of claim 1 wherein an inert gas is present in said sludge precipitation zone during said precipitation.

4. The process of claim 1 wherein hydrogen bromide is passed into said precipitation zone to the extent of 0.5 to 10% by weight of hydrocarbon.

5. The process of claim 4 wherein an inert gas is passed into said precipitation zone.

6. A process for stabilizing a solution of aluminum bromide in a saturated hydrocarbon which comprises forming a solution by dissolving aluminum bromide in said saturated hydrocarbon, maintaining said solution at a temperature no greater than about 110° F. for a period of about two to about five hours thereby precipitating a sludge, separating said sludge and said solution, said solution containing a major portion of the aluminum bromide originally dissolved therein, and storing said solution.

References Cited in the file of this patent

UNITED STATES PATENTS

| | | |
|---|---|---|
| 1,769,791 | Leamon | July 1, 1930 |
| 2,275,465 | Pines | Mar. 10, 1942 |
| 2,383,123 | Gorin | Aug. 21, 1945 |
| 2,438,340 | Johnson | Mar. 23, 1948 |
| 2,439,737 | Houston et al. | Apr. 13, 1948 |